(12) United States Patent
Suzuki (10) Patent No.: US 6,675,942 B2
(45) Date of Patent: Jan. 13, 2004

(54) FRICTION PLATE

(75) Inventor: Nobuyoshi Suzuki, Shizuoka-ken (JP)

(73) Assignee: NSK-Warner K.K., Tokyo (JP)

( * ) Notice: Subject to any disclaimer, the term of this patent is extended or adjusted under 35 U.S.C. 154(b) by 0 days.

(21) Appl. No.: 09/976,018

(22) Filed: Oct. 15, 2001

(65) Prior Publication Data

US 2002/0046912 A1 Apr. 25, 2002

(30) Foreign Application Priority Data

Oct. 20, 2000 (JP) ........................................ 2000-321771

(51) Int. Cl.$^7$ ................................................ F16D 13/62
(52) U.S. Cl. .................. 192/3.29; 192/113.36; 192/107 R
(58) Field of Search ................ 192/3.28, 3.29, 192/3.3, 113.36, 113.34, 107 R (56) References Cited

U.S. PATENT DOCUMENTS

| | | | | |
|---|---|---|---|---|
| 4,027,758 A | * | 6/1977 | Gustavsson et al. | ... 192/113.36 |
| 4,049,100 A | * | 9/1977 | Davis | ........................ 192/58.43 |
| 4,287,978 A | * | 9/1981 | Staub, Jr. | ................ 192/113.36 |
| 5,094,331 A | * | 3/1992 | Fujimoto et al. | ......... 192/70.12 |
| 5,660,259 A | * | 8/1997 | Peng et al. | ............. 192/113.36 |
| 5,776,288 A | * | 7/1998 | Stefanutti et al. | ........... 156/263 |
| 5,979,621 A | * | 11/1999 | Schoder | ...................... 192/3.29 |
| 6,170,629 B1 | | 1/2001 | Suzuki et al. | ................ 192/107 |
| 6,203,649 B1 | * | 3/2001 | Kremsmair et al. | ......... 156/211 |

FOREIGN PATENT DOCUMENTS

| DE | 19724973 C1 | * | 10/1998 |
|---|---|---|---|
| JP | 4-194422 A | * | 7/1992 |

\* cited by examiner

*Primary Examiner*—Saul Rodriquez
(74) *Attorney, Agent, or Firm*—Miles & Stockbridge P.C.

(57) ABSTRACT

In a friction plate formed by fixing a plurality of friction material segments on a core plate, an edge portion opposed to a mating member of an end portion of the friction material segment extends from an inner periphery side to an outer periphery side and has a cross-sectional shape in an axial direction formed of a curved face.

19 Claims, 6 Drawing Sheets

FRICTION PLATE

BACKGROUND OF THE INVENTION

1. Field of the Invention

The present invention relates to a friction plate for a multiple disc lock-up clutch used for a torque converter for an automatic transmission of a motor vehicle or the like equipment.

2. Related Background Art

In general, a friction plate for a multiple disc lock-up clutch used for a torque converter is manufactured by fixing a plurality of friction material segments to one face or both faces of a ring-shaped core plate in the circumferential direction thereof, and is used as a plate on the drive side, that is, a drive plate in the lock-up clutch.

Figure 14:
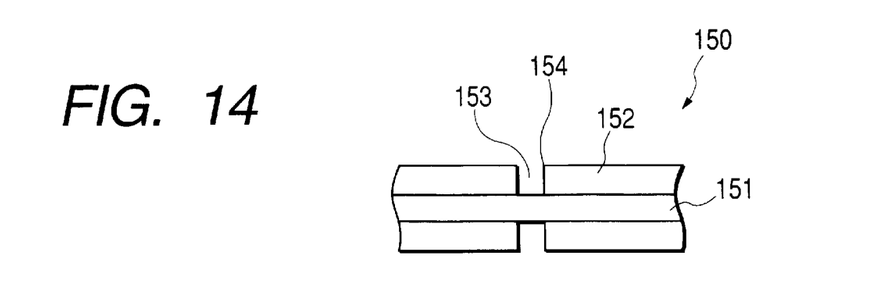
FIG. 14 is a partially enlarged view of a side face of a conventional friction plate.

FIG. 14 is a partially enlarged view of a side face of a conventional drive plate, that is, a friction plate 150. The friction plate 150 is configured by fixing a plurality of friction material segments 152 on both faces of a core plate 151. A gap is formed between the friction material segments 152 of the friction plate 150, and this gap provides an oil groove 153 for permitting communication between an inner peripheral edge and an outer peripheral edge. The oil groove 153 is provided to restrain clutch judder.

An impeller of torque converter, which is connected directly to an engine, is in a state of rotating normally. Therefore, an oil pressure of about 0.5 kgf is always present, so that some pressure is applied to the drive plate and a separator plate even if a piston of multiple disc lock-up clutch is not operated. This pressure presses the drive plate and the separator plate against the piston side to bring these plates into contact with each other, so that drag torque is produced. Also, the oil groove provided for restraining judder has a high oil discharging property, and has a tendency to respond sensitively to the above-described pressure to further increase the drag torque.

Also, an edge portion 154 at the end of the conventional friction material segment 152, which defines the oil groove 153, is substantially at right angles to the core plate 151. Therefore, it is difficult to form a desired oil film in the vicinity of the oil groove 153, so that the drag torque is liable to increase.

SUMMARY OF THE INVENTION

Accordingly, an object of the present invention is to provide a friction plate capable of reducing drag torque produced between the friction plate and the mating friction face.

To attain the above object, the present invention provides a friction plate formed by fixing a plurality of friction material segments on a core plate, in which an edge portion opposed to the mating member of an end portion of the friction material segment extends from the inner periphery side to the outer periphery side and has a cross-sectional shape in the axial direction formed of a curved face.

Also, the present invention provides a friction plate formed by fixing a plurality of friction material segments on a core plate, in which an edge portion opposed to the mating member of an end portion of the friction material segment extends from the inner periphery side to the outer periphery side and has a cross-sectional shape in the axial direction formed of a curved face, and the edge portion has dimensions in the range of 1% to 60% of the thickness of the friction material segment.

According to the friction plate in accordance with the present invention, since the curved edge portion is provided at the end of the friction material segment, a necessary oil film is produced between the friction plate and the mating friction face, so that drag torque can be reduced by this oil film.

Also, since a press molded groove is provided, a necessary oil film is produced between the friction plate and the mating friction face, so that drag torque can be reduced by this oil film.

DETAILED DESCRIPTION OF THE PREFERRED EMBODIMENTS

Embodiments of the present invention will now be described in detail with reference to the accompanying drawings. In the drawings, the same reference numerals are applied to the same elements.

Figure 1:
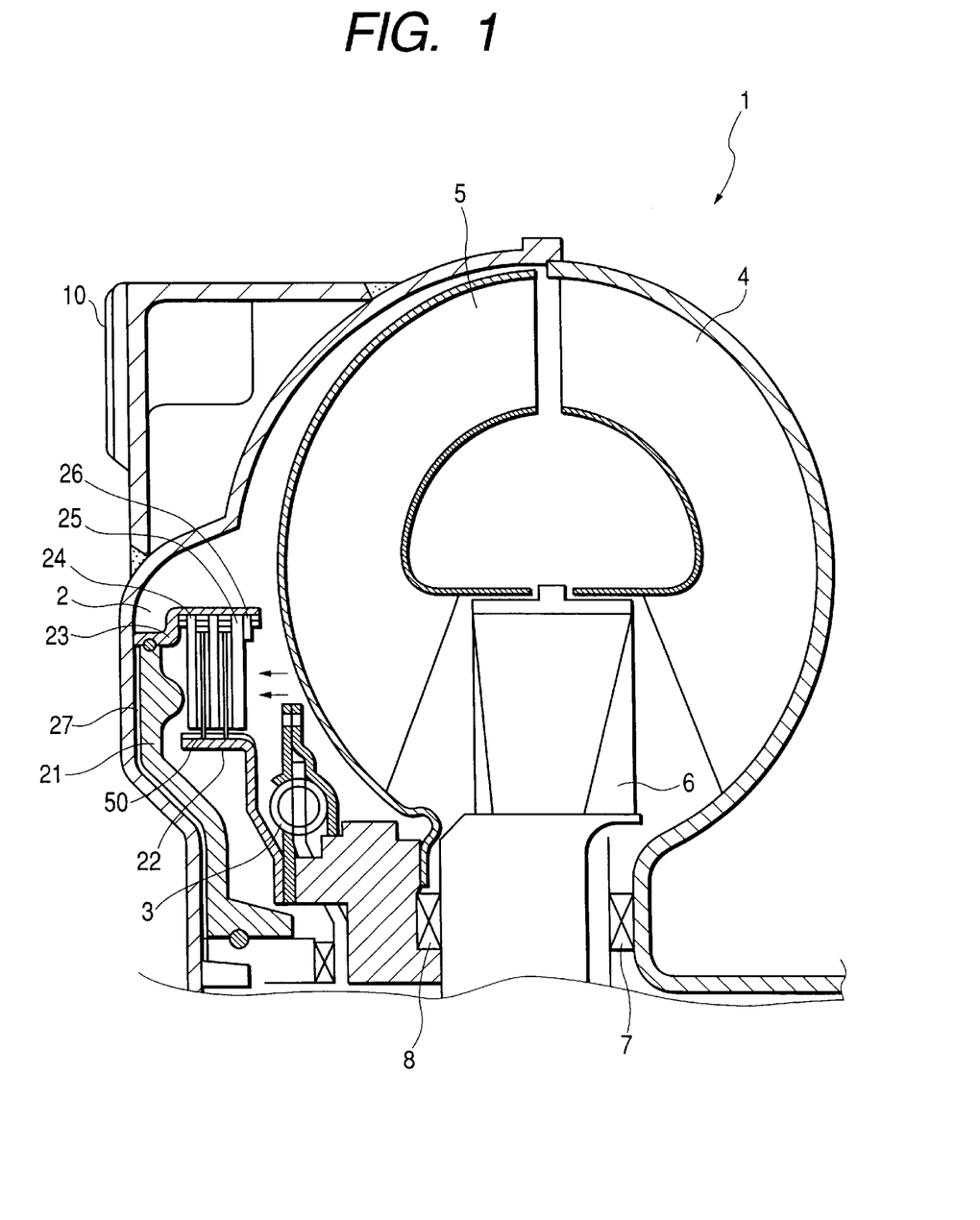
FIG. 1 is a sectional view showing one example of a torque converter using a multiple disc lock-up clutch to which a friction plate in accordance with an embodiment of the present invention can be applied.

FIG. 1 is a sectional view showing one example of a torque converter using a multiple disc lock-up clutch to which a friction plate in accordance with an embodiment of the present invention or a friction plate manufactured by a method and an apparatus for manufacturing the friction plate can be applied.

In FIG. 1, a torque converter 1 includes a multiple disc lock-up clutch 2, a damper 3, a pump impeller 4, a turbine impeller 5, and a stator 6. Both side portions in the axial direction of the stator 6 are supported by needle bearings 7 and 8, and a one-way clutch, not shown, is disposed at the inner periphery to prevent reverse rotation with respect to the specified direction.

The multiple disc lock-up clutch 2 is configured so as to have a separator plate 24 and a packing plate 25, which are spline engaged with the inner periphery of a clutch case 23, and a friction plate, that is, a drive plate 50 which is spline engaged with the outer periphery of a hub 22, which are disposed alternately, and are supported by a snap ring 26. Also, a piston 21 is provided on the left-hand side in the figure of these plates so as to be operated in the right direction in the figure when an oil pressure is applied to a hydraulic chamber 27, by which a tightening state, in which the separator plate 24, the drive plate 50, and the packing plate 25 are held between the piston 21 and the snap ring 26, is established. The torque converter 1 is filled with oil, and the multiple disc lock-up clutch 2 is disposed in the oil in a submerged state. As described above, the drive plate 50 and the separator plate 24 of the multiple disc lock-up clutch 2 are subjected to a pressure in the direction indicated by the arrows of FIG. 1 by the internal pressure of the torque converter 1. As described above, the drive plate 50 and the separator plate 24 are pressed against the piston 21 by this pressure and are thus brought into contact with each other, so that drag torque is produced. In the embodiments described below, the multiple disc lock-up clutch 2 is configured so as to reduce the drag torque.

First Embodiment

Figure 2:
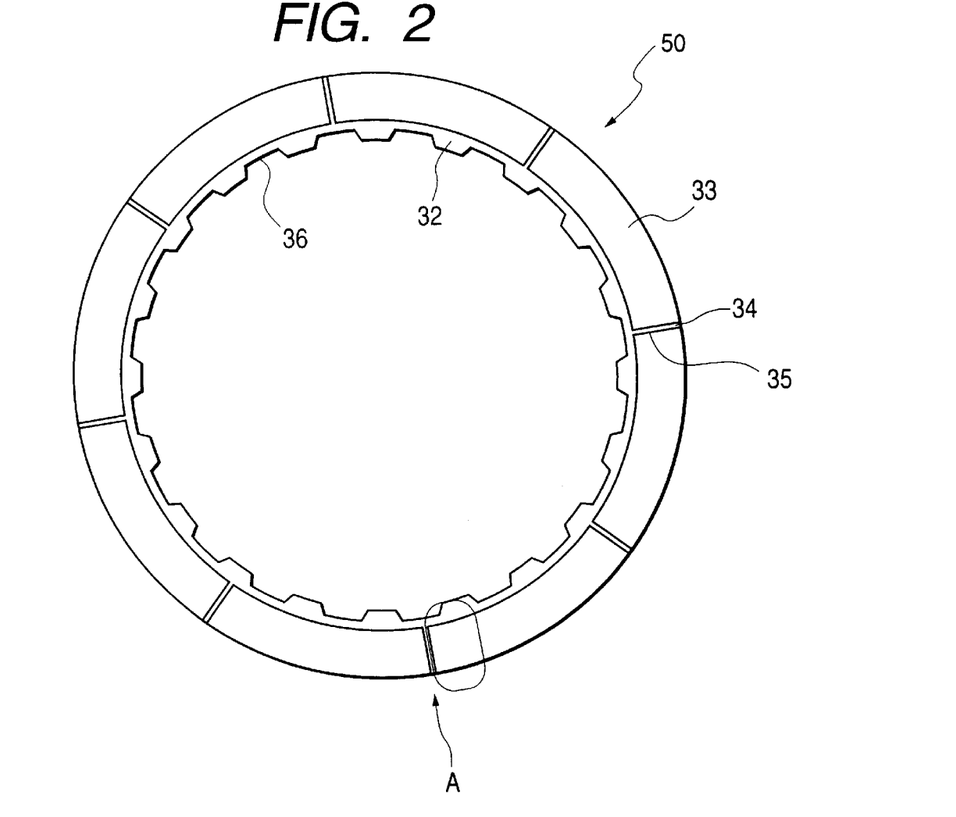
FIG. 2 is a front view of a friction plate in accordance with a first embodiment.
Figure 3:
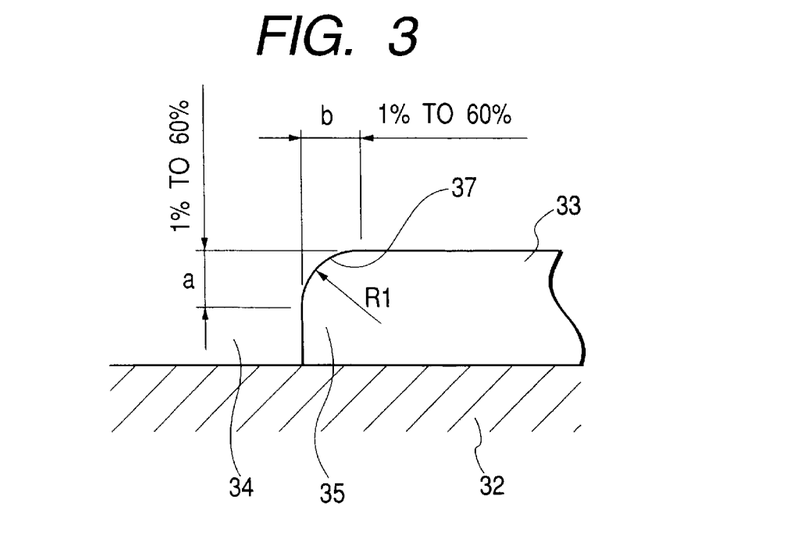
FIG. 3 is a partially enlarged view of a side face of the friction plate, showing a shape of an end portion of the friction plate.
Figure 4:
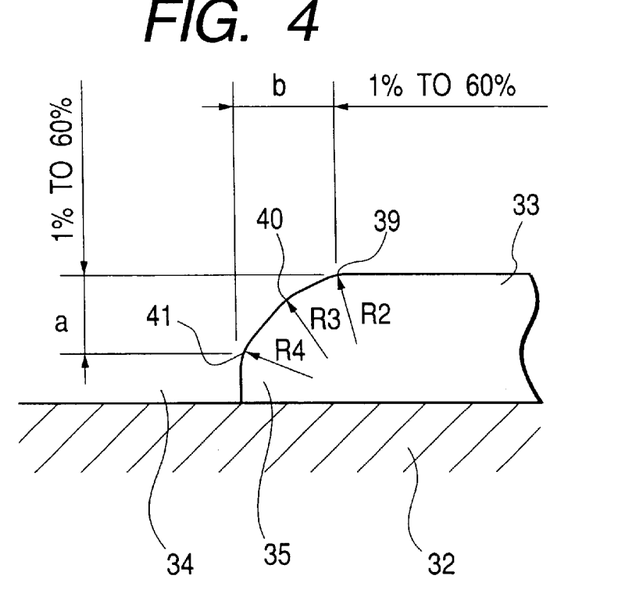
FIG. 4 is a partially enlarged view of a side face of the friction plate, showing a shape of an end portion of the friction plate.
Figure 5:
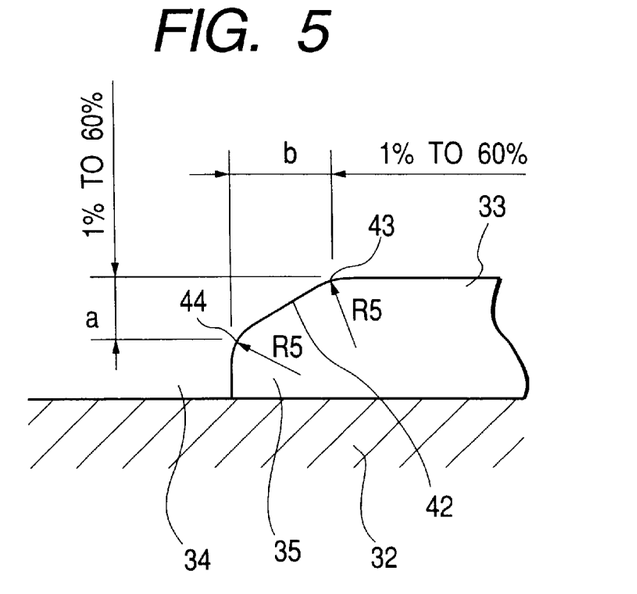
FIG. 5 is a partially enlarged view of a side face of the friction plate, showing a shape of an end portion of the friction plate.

FIGS. 2 to 5 show a friction plate 50 in accordance with a first embodiment of the present invention. FIG. 2 is a front view of the friction plate, and FIGS. 3 to 5 are partially enlarged views of a side face of the friction plate viewed in the direction indicated by the arrow A of FIG. 2, showing shapes of an end portion of the friction plate. In FIG. 2, the friction plate 50 includes a substantially ring-shaped core plate 32 having, at the inner periphery therein, splines 36 for spline-connecting with the outer periphery of the hub 22 shown in FIG. 1 and a plurality of friction material segments 33 fixed to one face or both faces of the core plate 32.

The friction material segments 33 are fixed onto the core plate 32 with a predetermined equal gap therebetween in the circumferential direction. This gap extends penetratingly from the inner periphery side to the outer periphery side in the radial direction of the friction plate 50 so as to serve as an oil groove 34 for causing lubricating oil etc. to flow. Both end portions 35 in the circumferential direction of the friction material segment 33 have a special shape on the face opposed to the mating member such as the separator plate as described below, unlike the conventional end portions, which are substantially perpendicular to the core plate, having been described with reference to FIG. 14.

FIG. 3 is a partially enlarged view of a side face of the friction plate 50 of the first embodiment, showing a shape of the end portion 35 of the friction material segment 33 fixed to the friction plate 50. The end portion 35 of the friction material segment 33 is formed so that an edge portion thereof opposed to the mating member has an arcuate shape in cross section, that is, has a curved face 37 with a radius curvature of R1. Specifically, the end portion 35 of the friction material segment 33 is formed as the curved face 37 extending from the inner periphery to the outer periphery in the radial direction.

A dimension a in the vertical direction and a dimension b in the horizontal direction of the curved face 37 are set so that each of the dimensions is in the range of 1% to 60% of the thickness of the friction material segment 33. In this case, either one of the dimensions a and b may be equal to or larger than the other, that is, any relationship of a>b, a=b, and a<b can hold.

FIG. 4 shows another example of the end portion 35 of the friction material segment 33 in accordance with the first embodiment. In the example shown in FIG. 4, in the end portion 35 of the friction material segment 33, a large curved face consisting of three small continuous curved faces is formed in cross section in the axial direction. The three curved faces 39, 40 and 41 have radiuses of curvature R2, R3 and R4, respectively. These radiuses of curvature can be different from each other, but they are preferably equal to each other.

Like the example shown in FIG. 3, a dimension a in the vertical direction and a dimension b in the horizontal direction of the large curved face are set so that each of the dimensions is in the range of 1% to 60% of the thickness of the friction material segment 33. In this case as well, either one of the dimensions a and b may be equal to or larger than the other, that is, any relationship of a>b, a=b, and a<b can hold.

FIG. 5 shows a still another example of the end face 35 of the friction material segment 33 in accordance with the first embodiment. In the example shown in FIG. 5, small curved faces 43 and 44 each having a radius of curvature R5 are formed at the start and end points of a flat slanting face 42. The radiuses of curvature of the curved faces 43 and 44 are preferably equal to each other, but they can be different from each other.

Like the example shown in FIG. 3, a dimension a in the vertical direction and a dimension b in the horizontal direction of the slanting face 42 are set so that each of the dimensions is in the range of 1% to 60% of the thickness of the friction material segment 33. In this case as well, either one of the dimensions a and b may be equal to or larger than the other, that is, any relationship of a>b, a=b, and a<b can hold.

Although the edge portions at both ends in the circumferential direction of the friction material segment 33 are formed of a curved face or a slanting face in the above-described embodiment, the edge portion at only one end can be formed of such a face. This holds true for the second embodiment described below.

Second Embodiment

Figure 6:
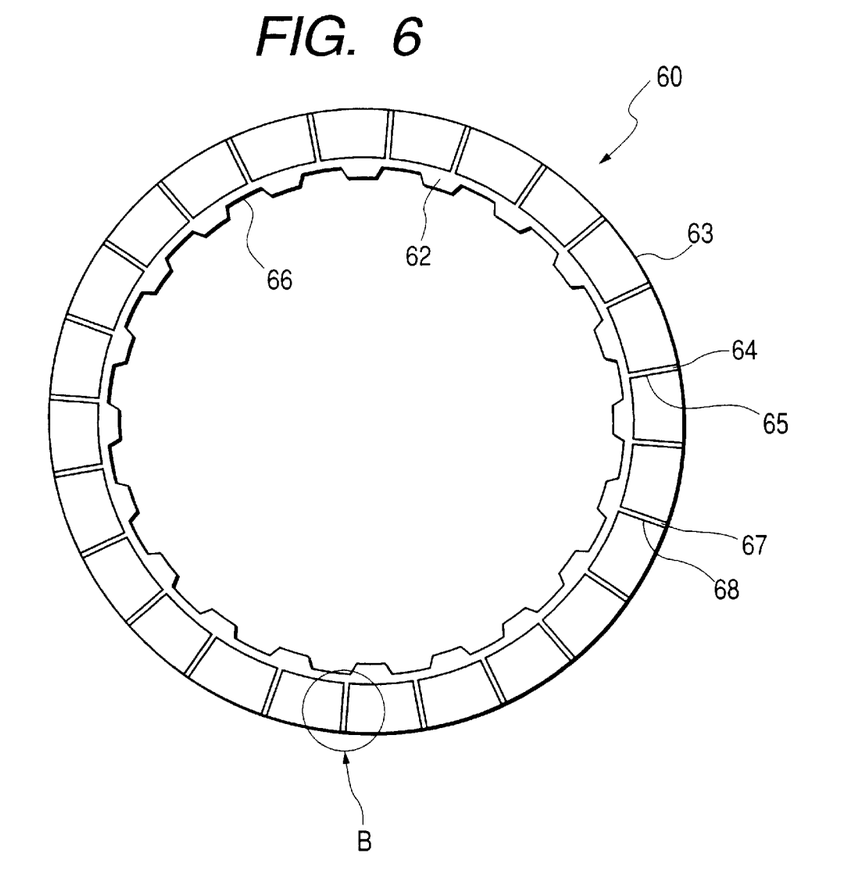
FIG. 6 is a front view of a friction plate in accordance with a second embodiment.

FIGS. 6 to 10 show a friction plate 60 in accordance with a second embodiment of the present invention. FIG. 6 is a front view of the friction plate, and FIGS. 7 to 10 are partially enlarged views of a side face of the friction plate viewed in the direction indicated by the arrow B of FIG. 6, showing shapes of an end portion of the friction plate. In FIG. 6, the friction plate 60 includes a substantially ring-shaped core plate 62 having, at the inner periphery therein, splines 66 for spline-connecting with the outer periphery of the hub 22 shown in FIG. 1, and a plurality of friction material segments 63 fixed to one face or both faces of the core plate 62.

The friction material segments 63 are fixed onto the core plate 62 with a predetermined equal gap therebetween in the circumferential direction. This gap extends penetratingly from the inner periphery side to the outer periphery side in the radial direction of the friction plate 60 so as to serve as an oil groove 64 for causing lubricating oil etc. to flow. Both end portions 65 in the circumferential direction of the friction material segment 63 have a special shape on the face opposed to the mating member such as the separator plate, unlike the conventional end portions, which are substantially perpendicular to the core plate, having been described with reference to FIG. 14. The shape can be the same as that described in the first embodiment.

Unlike the first embodiment, each of the friction material segment 63 is provided with a plurality of press molded grooves 67 having the same function as that of the oil groove 64. Each of the press molded grooves 67 extends penetratingly from the inner periphery side to the outer periphery side in the radial direction of the friction plate 60. In the case of this embodiment, one friction material segment 63 is provided with two press molded groove 67 at equal intervals between both ends. However, it is a matter of course that the number of press molded grooves is arbitrary, and an additional number of press molded grooves can be provided.

Both edge portions 68 defining the press molded groove 67 have a shape similar to the curved face or the slanting face of the first embodiment. The following is a description of the shape of the edge portion 68. The press molded groove 67 is press molded with a punch having the same cross-sectional shape as that shown in FIGS. 7 to 10 simultaneously when the friction material segment 63 is blanked out of a friction material sheet. Alternatively, the press molded groove 67 can be press molded after the friction material segment 63 has been fixed to the core plate 62.

Figure 7:
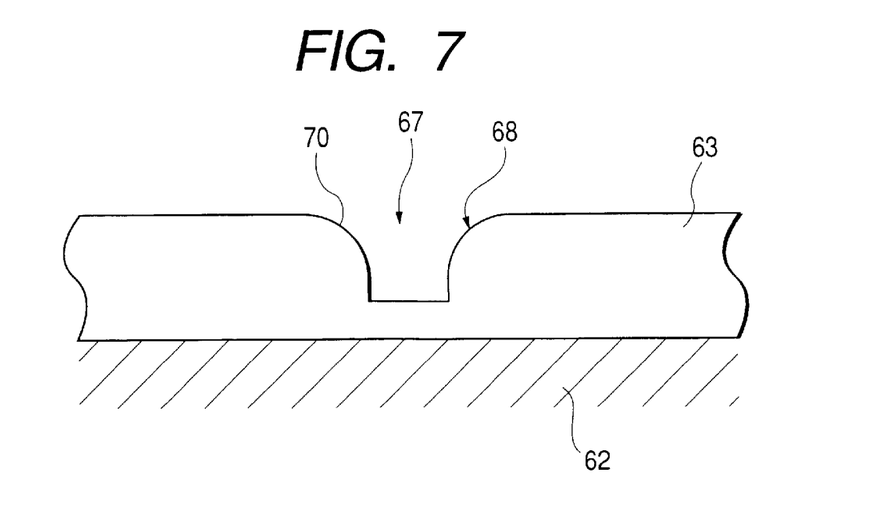
FIG. 7 is a partially enlarged view of a side face of the friction plate, showing a shape of a press molded groove of the friction plate.

FIG. 7 is a partially enlarged view of a side face of the friction plate, showing a shape of the press molded groove 67 in the friction material segment 63 fixed to the friction plate 60 of the second embodiment. The edge portion 68 opposed to the mating member of the press molded groove 67 in the friction material segment 63 has a cross-sectional shape formed of a curved face 70 having a predetermined radius of curvature. Both of the edge portions 68 of the press molded groove 67 are formed of the curved faces 70 opposed to each other. Also, the friction material segment 63 is thinnest in the bottom portion of the press molded groove 67.

Dimensions in the vertical direction and in the horizontal direction of the curved face 70 are set so that each of the dimensions is in the range of 1% to 60% of the thickness of the friction material segment 63 as in the case of the first embodiment. Also, the relationship between the dimensions in the vertical direction and in the horizontal direction is the same as that in the first embodiment.

Figure 8:
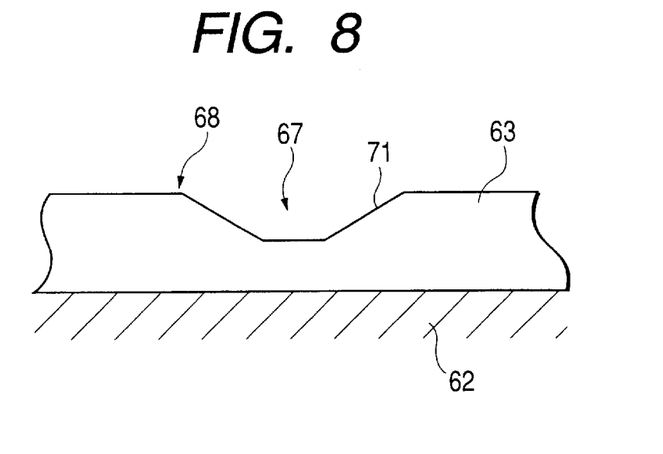
FIG. 8 is a partially enlarged view of a side face of the friction plate, showing a shape of a press molded groove of the friction plate.

FIG. 8 is a partially enlarged view of a side face of the friction plate, showing another shape of the press molded groove 67 of the second embodiment. The edge portion 68 opposed to the mating member of the press molded groove 67 in the friction material segment 63 has a cross-sectional shape formed of a slanting face 71 having a predetermined angle. Both of the edge portions 68 of the press molded groove 67 are formed of the slanting faces 71 opposed to each other. Also, the friction material segment 63 is thinnest in the bottom portion of the press molded groove 67.

Dimensions in the vertical direction and in the horizontal direction of the slanting face 71 are set so that each of the dimensions is in the range of 1% to 60% of the thickness of the friction material segment 63 as in the case of the first embodiment. Also, the relationship between the dimensions in the vertical direction and in the horizontal direction is the same as that in the first embodiment.

Figure 9:
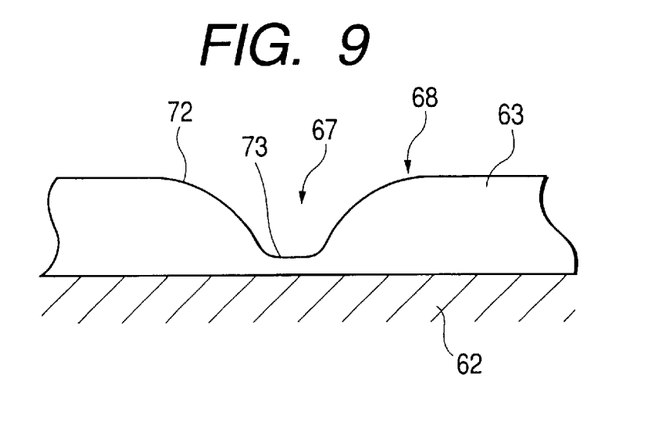
FIG. 9 is a partially enlarged view of a side face of the friction plate, showing a modification of the press molded groove shown in FIG. 7.
Figure 10:
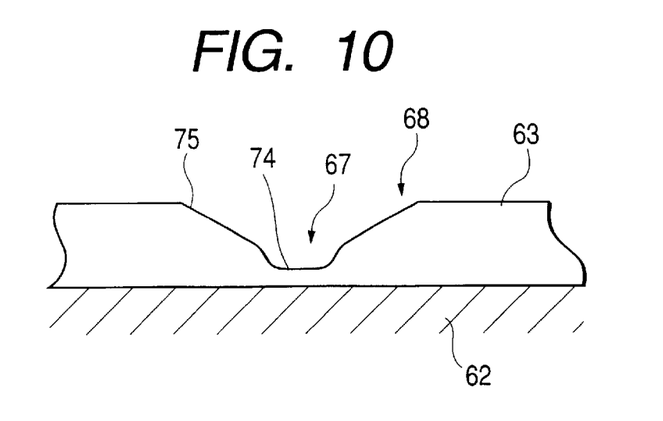
FIG. 10 is a partially enlarged view of a side face of the friction plate, showing a modification of the press molded groove shown in FIG. 8.

FIGS. 9 and 10 show modifications of the press molded groove 67 shown in FIGS. 7 and 8, respectively. The edge portion 68 defining the press molded groove 67 is formed of a curved face 72 in FIG. 9 and a slanting face 75 in FIG. 10. Bottom portions 73 and 74 of the press molded groove 67 shown in FIGS. 9 and 10 are characterized in that a corner portion thereof is formed in a round shape. This shape can be formed by using a punch with a projecting portion having a shape which is complementary to the bottom portion 73 or 74.

Figure 11:
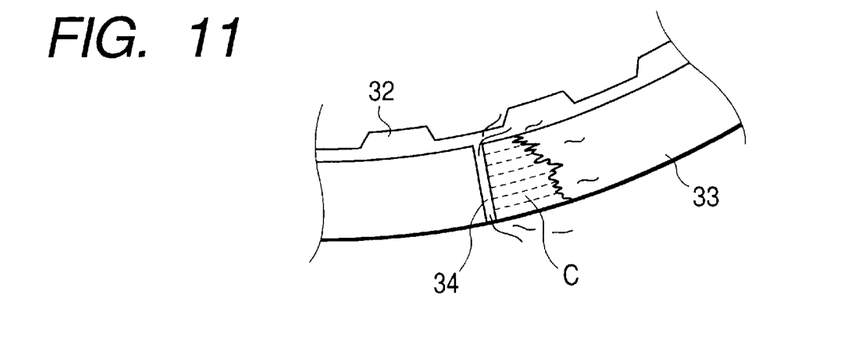
FIG. 11 is a partial front view in which the vicinity of an oil groove in the friction plate in accordance with the first embodiment shown in FIG. 2 is enlarged.
Figure 12:
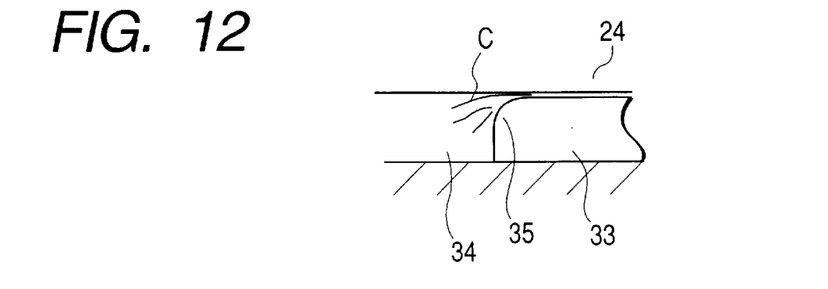
FIG. 12 is a side view of the friction plate, in which the vicinity of the oil groove shown in FIG. 11 is enlarged.
Figure 13:
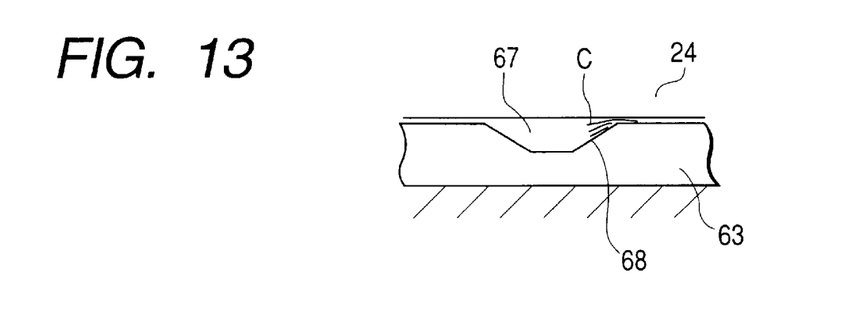
FIG. 13 is a side view of the friction plate, in which the vicinity of an oil groove in a friction material segment of the second embodiment is enlarged.

FIGS. 11 to 13 are views showing a state of an oil film produced between the friction plate and the mating member to serve to decrease sliding resistance in the embodiment according to the present invention. FIG. 11 is a partial front view in which the vicinity of the oil groove in the friction plate in accordance with the first embodiment shown in FIG. 2 is enlarged.

In FIG. 11, an oil film C is produced in the vicinity of the oil groove 34 on the friction material segment 33 between the friction plate and the mating member such as the separator plate 24. In the present invention, the sliding resistance can be reduced and thus the drag torque can be reduced by the action of the oil film C. In order to obtain the oil film C thick enough to sufficiently reduce the drag torque, the shape and dimension of the edge portion of the friction material segment 33, 63 are set as described above in the first and second embodiments.

FIG. 12 is a side view of the friction plate, in which the vicinity of the oil groove 34 shown in FIG. 11 is enlarged. Since the edge portion 35 is formed of a curved face, lubricating oil in the oil groove 34 easily goes up on the friction material segment 33 through this curved face, so that a desired oil film C is formed.

FIG. 13 is a side view of the friction plate 60, in which the vicinity of the oil groove 64 in the friction plate 60 of the second embodiment is enlarged. As in the case shown in FIG. 12, lubricating oil in the oil groove 64 easily goes up on the friction material segment 63 through the slanting face 68, so that a desired oil film C is formed.

Although the edge portion at the end of the friction material segment 63 has a shape as described in the first embodiment in the above-described second embodiment, the edge portion of the press molded groove 67 can be of a shape as described above while the end portion of the friction material segment 63 is perpendicular to the core plate 62 as in the case of the prior art.

Although the edge portions at both ends in the circumferential direction of the press molded groove 67 are formed of a curved face or a slanting face in the above-described embodiment, the edge portion at only one end can be formed of such a face.

The friction plate in accordance with the present invention described above can achieve effects described below.

Since the curved edge portion is provided at the end of the friction material segment, a necessary oil film is produced between the friction plate and the mating friction face, so that drag torque can be reduced by this oil film.

Also, since the press molded groove is provided, a necessary oil film is produced between the friction plate and the mating friction face, so that drag torque can be reduced by this oil film.

What is claimed is:

1. A friction plate having a plurality of friction material segments fixed on a core plate at circumferentially spaced positions,     wherein an edge portion of an end portion of at least one said friction material segment to be opposed to a mating member extends from an inner periphery side to an outer periphery side of said friction material segment and has a part of curved cross-sectional shape in a plane parallel to an axis of said core plate and perpendicular to said edge portion.

2. The friction plate according to claim 1, wherein said friction material segment is provided with a press molded groove.

3. The friction plate according to claim 1, wherein said curved cross-sectional shape of said part of said edge portion comprises a plurality of continuous curved segments.

4. The friction plate according to claim 1, wherein said curved cross-sectional shape of said part of said edge portion comprises a straight segment and curved segments disposed at both ends of said straight segment.

5. A friction plate having a plurality of friction material segments fixed on a core plate at circumferentially spaced positions, wherein an edge portion of an end portion of at least one said friction material segment to be opposed to a mating member extends from an inner periphery side to an outer periphery side of said friction material segment and has a part of curved cross-sectional shape in a plane parallel to an axis of said core plate and perpendicular to said edge portion, and said part of curved cross-sectional shape of said edge portion has dimensions in said plane perpendicular to said edge portion in a range of 1% to 60% of a thickness of said friction material segment.

6. The friction plate according to claim 5, wherein said curved cross-sectional shape of said part of said edge portion comprises a plurality of continuous curved segments.

7. The friction plate according to claim 5, wherein said curved cross-sectional shape of said part of said edge portion comprises a straight segment and curved segments disposed at both ends of said straight segment.

8. The friction plate according to claim 5, wherein said frictional material segment is provided with a press molded groove.

9. A friction plate having a plurality of friction material segments fixed on a core plate at circumferentially spaced positions, wherein at least one said friction material segment is provided with a press molded groove an edge portion of which has a part of curved cross-sectional shape in a plane parallel to an axis of said core plate and perpendicular to said edge portion.

10. The friction plate according to claim 9, wherein said part of curved cross-sectional shape of said edge portion has dimensions in said plane perpendicular to said edge portion in a range of 1% to 60% of the thickness of said friction material segment.

11. The friction plate according to claim 9, wherein said curved cross-sectional shape of said part of said edge portion comprises a plurality of continuous curved segments.

12. The friction plate according to claim 9, wherein said curved cross-sectional shape of said part of said edge portion comprises a straight segment and curved segments disposed at both ends of said straight segment.

13. A multiple disc lock-up clutch for a torque converter, comprising:

a clutch case;

a hub disposed in said clutch case;

a separator plate spline-engaged with one of an inner periphery of said clutch case and an outer periphery of said hub;

a friction plate spline-engaged with the other of said inner periphery of said clutch case and the outer periphery of said hub, and disposed in an axial direction adjacent to said separator plate; and a piston disposed to press said separator plate and friction plate to connect these plates to each other, wherein said friction plate has a plurality of friction material segments fixed on a core plate at circumferentially spaced positions, and an edge portion of an end portion of at least one said friction material segment opposed to a mating member extends from an inner periphery side to an outer periphery side of said friction material segment and has a part of curved cross-sectional shape in a plane parallel to an axis of said core plate and perpendicular to said edge portion.

14. The multiple disc lock-up clutch for a torque converter according to claim 13, wherein said part of curved cross-sectional shape of said edge portion has dimensions in said plane perpendicular to said edge portion in a range of 1% to 60% of the thickness of said friction material segment.

15. The multiple disc lock-up clutch for a torque converter according to claim 14, wherein said frictional material segment is provided with a press molded groove.

16. The multiple disc lock-up clutch for a torque converter according to claim 13, wherein said friction material segment is provided with a press molded groove.

17. The multiple disc lock-up clutch for a torque converter according to claim 13, wherein said friction material segment is provided with a press molded groove an edge portion of which has a part of curved cross-sectional shape in a plane parallel to an axis of said core plate and perpendicular to said edge portion.

18. The multiple disc lock-up clutch for a torque converter according to claim 13, wherein said curved cross-sectional shape of said part of said edge portion comprises a plurality of continuous curved segments.

19. The multiple disc lock-up clutch for a torque converter according to claim 13, wherein said curved cross-sectional shape of said part of said edge portion comprises a straight segment and curved segments disposed at both ends of said straight segment.

* * * * *